United States Patent Office 3,427,323
Patented Feb. 11, 1969

---

3,427,323
α-ALKOXYALKYLCYANAMIDES AND
THEIR PREPARATION
Frank D. Marsh, Wilmington, Del., assignor to E. I. du
Pont de Nemours and Company, Wilmington, Del.,
a corporation of Delaware
No Drawing. Continuation-in-part of applications Ser.
No. 383,233, July 16, 1964, and Ser. No. 215,800,
Aug. 9, 1962. This application July 12, 1966, Ser. No.
564,534
U.S. Cl. 260—340.6                                    7 Claims
Int. Cl. C07c 125/08

---

ABSTRACT OF THE DISCLOSURE

Monomeric α-alkoxyalkylcyanamides of the formula

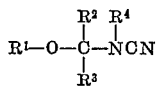

where $R^2$, $R^3$ and $R^4$ are hydrogen or lower alkyl and R is alkyl or substituted alkyl of up to 12 carbons. The compounds are prepared by reacting cyanogen azide with an ether of the formula

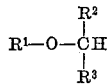

---

RELATED APPLICATIONS

This application is a continuation-in-part of my copending application Ser. No. 383,233, filed July 16, 1964, and my copending application Ser. No. 215,800, filed Aug. 9, 1962.

FIELD AND DETAILS OF THE INVENTION

This invention relates to organic cyanamides and their preparation. More specifically, it concerns monomeric α-alkoxyalkylcyanamides and certain cyanamido-substituted polymeric alkyl ethers and their preparation.

The novel monomeric α-alkoxyalkylcyanamides of the invention are represented by the structural formula

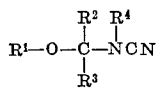

wherein $R^2$, $R^3$, and $R^4$ separately are each hydrogen or lower alkyl; $R^1$ is alkyl of up to 12 carbon atoms or substituted alkyl of up to 12 carbon atoms in which the substituents are lower alkoxy, halogen (fluorine, chlorine, bromine, or iodine), cyano, lower alkoxycarbonyl, lower alkylcarbonyloxy, or nitro; $R^2$ and $R^3$ taken together represent a divalent alkylene or an oxaalkkylene group of 3–5 carbon atoms; and $R^1$ and $R^3$ taken together represent a divalent alkylene group of 1–4 carbon atoms which can be substituted with lower alkoxy.

The novel cyanamido-substituted polymeric alkyl ethers can be described as polymeric ethers in which the recurring units are divalent oxaalkylene groups of 1–3 carbon atoms or divalent alkoxyethylene groups of 3–8 carbon atoms, said polymeric ethers having a cyanamido (—NHCN) group attached to 1–50% of the α-oxa carbon atoms.

The novel monomeric products are prepared initially by reacting cyanogen azide with an ether of the formula

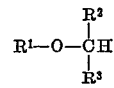

wherein $R^1$, $R^2$, and $R^3$ are defined as above. The reaction is carried out at temperatures of between about 25–150° C. and preferably between 30–75° C. Pressure is not critical and atmospheric, super- or subatmospheric pressures can be used in batch, continuous flow, or vapor phase processes.

The process is conducted by simply heating the cyanogen azide with 0.1 to 100 equivalents of the ether.

Cyanogen azide is extremely reactive and should not be allowed to dry. It is ordinarily prepared in an inert solvent such as acetonitrile or ethyl acetate and placed in the reaction mixture in solution. Or it can be prepared in situ with the ether as the reaction mixture. These processes are more fully described in my above-mentioned co-pending U.S. application Ser. No. 215,800.

The novel monomeric products can be isolated by conventional procedures. Thermally stable products can be distilled under reduced pressure. The novel products can also be obtained by chromatography, extraction or crystallization. Sufficiently pure products for most applications can be obtained by filtering the reaction mixture and removing the excess solvent or ether.

To obtain products in which $R^4$ is lower alkyl, the initial product

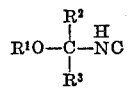

is reacted with a lower alkyl halide in the presence of an alkali metal alkoxide at 30–50° C. The products can be isolated as previously described.

The novel cyanamido-substituted polymeric alkyl ethers are obtained by reacting cyanogen azide with a polymeric ether having recurrent oxaalkylene units of 1–3 carbon atoms or recurrent alkoxyethylene units of 3–8 carbon atoms. The reaction is carried out at temperatures of between about 25–150° C. and preferably between 30–75° C. in a medium which is a solvent for the cyanogen azide and which may or may not be a solvent for the polymeric ether. Pressure is not critical.

The process is conducted by simply heating the cyanogen azide with 0.1 to 100 equivalents of the polymeric ether. Inert solvents for cyanogen azide in this process include saturated aliphatic hydrocarbons, halogenated saturated aliphatic hydrocarbons, saturated aliphatic esters, and saturated aliphatic nitriles. Prepresentative polymeric alkyl ether reactants include polyformaldehyde (preferably alkyl-capped high molecular weight polyoxymethylene), polyethylene oxide, polypropylene oxide, polydioxolane, and polyvinyl methyl ether.

The following examples serve to illustrate the invention but are not intended to limit it:

Example I

A. 1-ETHOXYETHYLCYANAMIDE

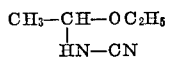

Cyanogen azide, prepared from sodium azide (3.25 g., 0.05 mole) and cyanogen chloride (25 ml.), was diluted with diethyl ether (50 ml.) and heated at 30–37° C. for 26 hours, during which time nitrogen (0.038 mole) was liberated. Cyclohexene (8 ml.) was added to destroy any unreacted cyanogen azide. No additional nitrogen was liberated. The reaction mixture was filtered and the volatiles removed from the filtrate at 1 mm./25° C. to give a light tan, mobile oil having an infrared spectrum essentially identical with that of 1-ethoxyethylcyanamide (Part B, below). This sample underwent exothermic self-condensation on standing at room temperature.

B. 1-ETHOXYETHYLCYANAMIDE

Cyanogen azide (0.25 mole), prepared in acetonitrile to give a total volume of 110 ml., was diluted with diethyl ether (900 ml.) and heated at reflux temperature (36–37° C.) for 11 hours. Nitrogen was liberated (0.25 mole) and the solution became cloudy. The reaction mixture was filtered to separate an amorphous solid (2 g.) and the filtrate evaporated to dryness to give a light straw-colored mobile oil (23.2 g., 82%). The infrared spectrum of a neat sample showed absorption at $3.1\mu$ (NH), $3.4\mu$ (C—H), $4.5\mu$ (CN). $6.23\mu$ (probably impurity), and $8.4$–$9.5\mu$ (C—O—C). A sample of this product from another preparation distilled at $1\mu$ pressure and a pot temperature of 63–73° C. with decomposition and/or rearrangement to give a colorless oil.

A further sample (0.6 mole) prepared as described above, was filtered and the volatiles removed at 1 mm./25° C. The heat oil formed well-defined crystals when cooled at −78° C. An aliquot of this oil (4.0 g.) was dissolved in methylene chloride (50 ml.) and passed through 1″ bed of Florisil containing a little Darco. The solvent was removed from the eluent under reduced pressure to give a nearly colorless oil (3.5 g.). The H n.m.r. spectrum of this oil in carbon tetrachloride with tetramethylsilane as internal standard showed a doublet at $\tau 3.58$ (1H, $J=5.9$ c.p.s.) assigned to the proton on nitrogen, a symmetrical 5-lined pattern at $\tau 5.34$–$5.70$ (1H, $J=5.9$ c.p.s.) assigned to the single proton on carbon adjacent to nitrogen and oxygen, a 14-lined pattern at $\tau 6.0$–$6.82$ (2H) assigned to the methylene protons adjacent to oxygen, a doublet at $\tau 8.62$ (3H, $J=5.9$ c.p.s.) for one methyl group, and a triplet at $\tau 8.82$ (3H, $J=7.3$) for the protons of the methyl group attached to the methylene group.

Example II

METHYL-1-ETHOXYETHYLCYANAMIDE AND METHYL-1-METHOXYETHYLCYANAMIDE

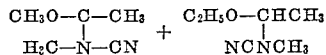

To a solution of crude 1-ethoxyethylcyanamide (11.4 g., 0.1 mole) in ether (150 ml.) was added with stirring and cooling (0–4 C.) sodium methylate (5.5 g., 0.1 mole) in absolute ethanol (50 ml.). When addition was complete, methyl iodide (15 g., 0.11 mole) was added and the mixture stirred and heated for 2 hours at 40° C. The reaction mixture was added to either (400 ml.) and filtered. The filtrate was washed with water (50 ml.), dried and the ether removed under pressure to give a light straw-colored oil (11.3 g., 88.5%). This oil was distilled in a short-path still at $2\mu$ pressure at a pot temperature of 20–40° C. to give a colorless oil (4.6 g.). Analysis by vapor phase chromatography showed this oil to contain at least two components in a ratio of 16:83. The reaction product was combined with that from a similar run and an aliquot (10.6 g.) separated by vapor phase chromatography on a 3′ x ¾″ annular column packed with 25% "Silicon Gum Nitrile XE-60" on firebrick (Gas Chrom R) at a temperature of 130° C. and a helium flow of 550 cc./min. The fraction collected at a retention time of 23.3 min. (B.P. 19–20°/$0.1\mu$, $n_D^{25.5}$ 1.4231, 0.42 g.) was identified as methyl-(1-methoxyethyl)cyanamide.

*Analysis.*—Calcd. for $C_5H_{10}N_2O$: C, 52.61; H, 8.83; N, 24.54; M.W., 114. Found: C, 52.42; H, 8.83; N, 24.76; M.W., 114 (mass spec.)

The H n.m.r. spectrum on a neat sample was TMSi as internal standard showed a quadruplet at $\tau 5.65$ (1H, $J=5.80$) assigned to the single proton on carbon adjacent to oxygen, a single peak at $\tau 6.69$ (3H) for the methoxyl protons, a single peak at $\tau 7.21$ (3H) for the protons of the methyl group attached to nitrogen and a doublet at $\tau 8.90$ (3H, $J=5.80$) for the protons of the methyl group attached to carbon.

The infrared spectrum of a neat sample showed absorption at 3.33, 3.39, $3.52\mu$ (saturated C—H), $4.51\mu$ (CN), $7.23\mu$ (CCH), and $8.85\mu$ (C—O—C).

A second fraction collected at a retention time of 34.7 min. (B.P. 25°/$0.1\mu$, $n_D^{25}$ 1.4291, 6.42 g.) was shown to be methyl-(1-ethoxyethyl)cyanamide.

*Analysis.*—Calcd. for $C_6H_{12}N_2O$: C, 56.22; H, 9.44; N, 21.86; M.W., 128. Found: C, 56.03; H, 9.39; N, 22.24; M.W., 128 (mass spec.).

The H n.m.r. spectrum determined on a neat sample with tetramethylsilane as internal standard showed a quadruplet at $\tau 5.55$ (1H, $J=5.80$), assigned to the single proton on carbon adjacent to oxygen, a complex group (13–15 lines) centered at $\tau 6.44$ (2H) and assigned to the methylene protons adjacent to oxygen, a single strong absorption at $\tau 7.22$ (3H) for the protons of the methyl group attached to nitrogen, a doublet at $\tau 6.68$ (3H, $J=5.80$) for the methyl protons attached to the carbon bearing both nitrogen and oxygen and a triplet at $\tau 8.83$ (3H, $J=6.90$) for the methyl protons attached to the methylene group.

Absorption in the infrared spectrum occurred at 3.37, $3.46\mu$ (saturated C—H), $4.53\mu$ (CN), $7.25\mu$ (C—$CH_3$), and $8.95\mu$ (C—O—C).

Crude 1-ethoxyethylcyanamide, when alkylated by this procedure with sodium ethylate as base, gave only methyl-1-ethoxyethylcyanamide isolated in 76% yield and distilled to give the pure product in 69% yield.

Example III

TETRAHYDROFURAN-2-CARBAMONITRILE

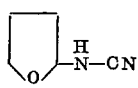

To a solution of cyanogen chloride (29.4 g., 0.43 mole) in tetrahyrofuran (100 ml.) at 0° was added sodium azide (3.25 g., 0.05 mole). The mixture was warmed slowly to room temperature and stirred for 17 hours, during which time nitrogen was liberated. The reaction mixture was filtered and the filtrate evaporated to dryness at 1 mm./ 25° C. to give a clear, mobile oil (5.5 g., 98%). The infrared spectrum was essentially the same as that of the distilled product described below and shown to consist primarily of tetrahydrofuran-2-carbamonitrile. This oil formed a salt with silver nitrate.

In a subsequent preparation, cyanogen azide (0.85 mole) dissolved in acetonitrile to a total volume to 275 ml. was diluted with dry tetrahydrofuran (2000 ml.) and heated at 30–47° C. for 3 hours (the reaction was exothermic above 39° C.), during which time nitrogen (0.84 mole) was liberated. The reaction mixture was evaporated to dryness at 1 mm./30° C. to give a light straw-colored mobile oil (85.6 g., 90%).

An aliquot of this product (28.8 g.) was diluted with diethyl ether (300 ml.) and passed through a 1″ bed of Florisil. The eluent was evaporated to dryness to give an almost colorless, mobile oil (23.7 g.) which was distilled in a short-path still at 0.6μ and a pot temperature of 64–95° to give four fractions of a colorless oil (16.1 g., $n_D^{24.5}$ 1.4581–1.4839). The lowest boiling fraction contained up to 35.5% nitrogen, but the highest boiling fraction analyzed correctly for tetrahydrofuran-2-carbamonitrile.

*Analysis.*—Calcd. for $C_5H_8N_2O$: C, 53.56; H, 7.19; N, 24.98; M.W., 112. Found: C, 53.30; H, 6.90; N, 25.35, 25.01; M.W., 128 (cryoscopic in benzene).

The H n.m.r. spectrum of fraction 2 determined on a neat sample with tetramethylsilane as internal standard gave a broad absorption at τ3.85 (1H) and three complex groups at τ4.61–5.43 (2H), τ5.80–6.40 (2H), and τ7.50–8.43 (4H).

The infrared spectrum of a neat sample showed absorption at 3.08μ (NH), 3.34, 3.43μ (saturated C—H), 4.46μ (CN), 6.05μ (possibly C=O or C=N impurities), 9.55μ (C—O—C).

Example IV

N-METHYLTETRAHYDROFURAN-2-CARBAMONITRILE

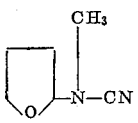

Crude tetrahydrofuran-2-carbamonitrile (20.5 g., 0.18 mole) was dissolved in ethanol (100 ml.). The solution was stirred and cooled at 0–2° C. while sodium methylate (10.8 g., 0.2 mole) dissolved in ethanol (100 ml.) was added. When addition was complete, methyl iodide (75 g., 0.53 mole) was added and the mixture stirred at 52–57° C. for 17 hours. Volatiles were removed from the reaction mixture at 1 mm./30° C. and the residue taken up in methylene chloride (200 ml.) and filtered. The filter cake was dissolved in water and extracted with methylene chloride. The dried extract was combined with the filtrate and evaporated to dryness at 1 mm./30° C. to give a mobile, tan oil (18.4 g., 90%). This oil was distilled in a short-path still to give essentially pure N-methyltetrahydrofuran-2-carbamonitrile (14.4 g., 70%).

An aliquot of this oil was further purified by vapor phase chromatography on a 6′ x ⅜″ column packed with 20% "Silicon Gum Nitrile XE–60" on firebrick, 60/80 mesh ("Gas Chrom R"), at a column temperature of 175° C., a preheat temperature of 200° C., and a helium flow of 200 cc./min. The colorless oil, collected at a retention time of 36.2 min., was distilled (B.P. 24°/ 0.1μ, $n_D^{25.5}$ 1.4570) and analyzed.

*Analysis.*—Calcd. for $C_6H_{10}N_2O$: C, 57.12; H, 7.99; N, 22.21; M.W., 126. Found: C, 57.16; H, 8.00; N, 22.47; M.W., 129 (cryoscopic in benzene).

The H n.m.r. spectrum determined on a neat sample with TMSi as internal standard gave a triple (further split) at τ5.17 (1H) assigned to the single proton on carbon adjacent to nitrogen and oxygen, a distorted sextet at τ6.17 (2H) assigned to the methylene group adjacent to oxygen, a single peak at τ7.17 (3H) for the protons of the methyl group on nitrogen and a complex pattern at τ7.64–8.63 (4H) for the methylene protons most remote from oxygen.

The infrared spectrum of a neat sample showed absorption at 3.37 and 3.45μ (CH), 4.50μ (CN) and 9.60μ (C—O—C).

Example V

1,4-DIOXANE-2-CARBAMONITRILE AND N-METHYL-1,4-DIOXANE-2-CARBAMONITRILE

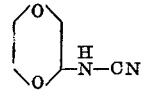

Cyanogen azide (0.27 mole) in acetonitrile (95 ml.) was diluted with dioxane (686 ml.) and heated with stirring at 44–62° C. for 5 hours, during which time nitrogen (0.27 mole) was liberated. One-third of the reaction mixture was evaporated to dryness at 0.1μ/25° C. to give a mobile oil (9.72 g., 93.6%). The remainder of the reaction mixture was cooled to 0–4° C. and sodium ethylate (11.8 g., 0.18 mole) dissolved in absolute ethanol (75 ml.) added slowly with stirring. When addition was complete, the mixture was stirred at 0° for 10 min. Methyl iodide (52 g.) was added and the reaction mixture heated at 65–70° C. for 6 hours. The mixture was filtered and the filtrate evaporated to dryness under reduced pressure. The residue was taken up in methylene chloride, filtered and the filtrate evaporated to dryness to give a mobile brown oil (16.2 g.). This oil was distilled in a molecular still at 0.04μ pressure and a pot temperature of 30–105° C. to give a colorless oil (6.79 g.). A sample prepared in this way was purified by vapor phase chromatography on a 3′ column packed with 25% "Silicone Gum Nitrile XE–60″ on firebrick at a temperature of 175° C. and a helium flow of 430 cc./min. The sample collected at a retention time of 55.7 min. was distilled (B.P. 35–37° C./0.01μ, $n_D^{25}$ 1.4660) and was shown to be N-methyl-1,4-dioxane-2-carbamonitrile.

*Analysis.*—Calcd. for $C_6H_{10}N_2O$: C, 50.69; H, 7.09; N, 19.71; M.W., 142. Found: C, 50.33, 50.35; H, 7.05, 6.99; N, 19.9; M.W., 147 and 148 (cryoscopic in benzene).

The H n.m.r. spectrum determined on a neat sample with tetramethylsilane as internal standard showed a single sharp absorption at τ7.08 (3H) assigned to the methyl protons and a typical A-B-C-type pattern for the remaining protons including two doublets at τ5.60 and τ5.71 (1H) assigned to the single proton on carbon adjacent to oxygen and a 14-line pattern at τ5.90–6.80 (6H) assigned to the remaining methylene protons.

The infrared spectrum showed absorption at 3.37μ, 3.44μ, 3.50μ (saturated C—H), 4.52μ (CN), and multiple peaks in the 9μ region (cyclic C—O—C).

The following table lists additional ether reactants and the corresponding products obtained by the general processes described in the examples:

| Ethers | | Products |
|---|---|---|
| Methyl-n-butyl ether | CH₃O—CH—(CH₂)₂CH₃<br>　　　　NHCN | 1-methoxybutylcyanamide. |
| | CH₂—O—(CH₂)₃CH₃<br>HNCN | Butoxymethylcyanamide. |
| Methyl-t-butyl ether | CH₂—OC(CH₃)₃<br>HN—CN | tert.-Butoxymethylcyanamide. |
| Methylcyclopentyl ether | CH₃—O—⟨cyclopentyl⟩<br>　　HN—CN | 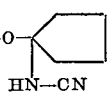 Cyclopentoxymethylcyanamide. |
| | 1-methoxycyclopentane-1-carbamonitrile | |
| Ethyl-n-heptyl ether | CH₃—CH—O(CH₂)₆—CH₃<br>　　HNCN | 1-heptoxyethylcyanamide. |
| | CH₃—CH₂—OCH—(CH₂)₅CH₃<br>　　　　　　NHCN | 1-ethoxyheptylcyanamide. |
| Isoamyl ether | (CH₃)₂—CHCH₂CH—O(CH₂)₂—CH(CH₃)₂<br>　　　　　　NHCN | 1-isopentoxy-3-methylbutylcyanamide. |
| Isopropyl ether | (CH₃)₂C—O—C(CH₃)₂<br>　　　HNCN (H above C) | 1-isopropoxy-1-methylethylcyanamide. |
| Tetrahydropyran | 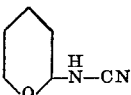 | Tetrahydropyran-2-carbamonitrile. |
| Methyl-α-furyl ether | 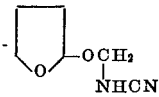 | 2-furyloxymethylcyanamide. |
| | 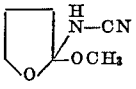 | 2-methoxytetrahydrofuran-2-carbamonitrile. |
| | 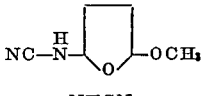 | 5-methoxytetrahydrofuran-2-carbamonitrile. |
| | 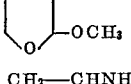 | 2-methoxytetrahydrofuran-3-carbamonitrile. |
| Ethylene oxide | 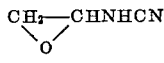 CH₂—CHNHCN (O bridge) | Oxirane-2-carbamonitrile. |
| Tetramethylene oxide | 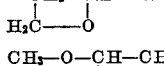 CH₂—CH—NHCN<br>H₂C——O | Oxetane-2-carbamonitrile. |
| Dimethyl ether of ethylene glycol | CH₃—O—CH—CH₂—OCH₃<br>　　　　HNCN | 1,2-dimethoxyethylcyanamide. |
| | CH₂—O—CH₂CH₂OCH₃<br>HN—CN | Methoxyethoxymethylcyanamide. |
| Ethyl n-pentyl ether of ethylene glycol | CH₃CH—OCH₂CH₂O—(CH₂)₄CH₃<br>　　HNCN | 1-(pentoxyethoxy)ethylcyanamide. |
| | CH₃CH₂OCH—CH₂—O(CH₂)₄CH₃<br>　　　　HNCN | 1-ethoxy-2-pentoxyethylcyanamide. |
| | CH₃CH₂OCH₂CH—O(CH₂)₄CH₃<br>　　　　　HNCN | 1-pentoxy-2-ethoxyethylcyanamide. |
| | CH₃CH₂OCH₂—CH₂O—CH(CH₂)₃CH₃<br>　　　　　　　HNCN | 1-(ethoxyethoxy)pentylcyanamide. |

| Ethers | | Products |
|---|---|---|
| Chloromethyl ethyl ether | CH₂—O—CH₂—CH₃ with Cl and NH—CN | 1-(chloromethoxy)ethylcyanamide. |
| Bromomethyl, 2-butyl ether | CH₃ \| CH₂—OC—CH₂CH₃ with Br and NHCN | 1-methyl-1-(bromomethoxy)propylcyanamide. |
| 2,3-dichlorotetrahydropyran | Cl-substituted tetrahydropyran with H—N—CN | 5,6-dichlorotetrahydropyran-2-carbamonitrile. |
| α-Cyanotetrahydrofuran | NC—(tetrahydrofuran)—N(H)—CN | 5-cyanotetrahydrofuran-2-carbamonitrile. |
| 2-furylacetonitrile | NC—N(H)—(tetrahydrofuran)—CH₂CN | 5-cyanomethyltetrahydrofuran-2-carbamonitrile. |
| Methyl β-methoxypropionate | CH₃OCH—CH₂C(=O)—OCH₃ with NHCN | 1-methoxy-2-(methoxycarbonyl)-ethylcyanamide. |
| | CH₂—OCH₂CH₂C(=O)—OCH₃ with HN—CN | Methoxycarbonylethoxymethylcyanamide. |
| Methyl ether of ethylene glycol monoacetate | CH₃O—CHCH₂OC(=O)—CH₃ with HN—CN | 1-methoxy-2-acetoxyethylcyanamide. |
| | CH₂—OCH₂CH₂OC(=O)—CH₃ with HN—CN | Acetoxyethoxymethylcyanamide. |
| Methyl-2-nitroethyl ether | CH₂—O—CH₂—CH₂ with NHCN and NO₂ | 2-nitroethoxymethylcyanamide. |
| | CH₃—OCH—CH₂NO₂ with HN—CN | 1-methoxy-2-nitroethylcyanamide. |

Example VI

PRODUCTS FROM POLYOXYMETHYLENE AND CYANOGEN AZIDE

Samples of alkyl-capped polyoxymethylene were suspended in ethyl acetate (circa 20 ml./g. of polymer), portions of 1.2 to 2.0 molar cyanogen azide in ethyl acetate were added, and the mixtures were heated under reflux for 2 to 3 hours. The yellow solid products were separated by filtration and then treated with boiling water which removed the yellow color and converted pendent cyanamido (—NHCN) groups to corresponding carbamido (—NHCONH₂) groups. Films of the resultant products showed infrared absorption at 1670 to 1600 cm.$^{-1}$, indicative of amide substituents (absent in the original polyoxymethylene). Additional data are given in the following table:

| Sample: | mmoles N₃CN, charged per gram Polyoxymethylene | Percent N [1] | $\eta_{inh.}$ (phenol) |
|---|---|---|---|
| Control | | | 1.02 |
| A | 1.0 (1.2 molar) | 1.6 | 0.4 |
| B | 1.7 (1.24 molar) | 3.0 | |
| C | 3.3 (2.0 molar) | 4.0 | 0.77 |
| D | 4.2 (1.2 molar) | 8.0 | 0.32 |

[1] 100% reaction of polyoxymethylene and N₃CN followed by hydrolysis would give polymer having the recurring unit

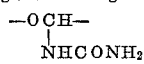

for which the theoretical nitrogen analysis is 31.82%.

Low-molecular-weight monomeric α-alkoxyalkylcyanamides are usually water-soluble, mobile oils which self-condense spontaneously on heating at 25–150° C. to give high-melting solids. Higher-molecular-weight monomeric α-alkoxyalkylcyanamides are more stable and frequently crystalline solids. These cyanamides are mildly acidic and will react with silver nitrate, metal alkoxides or sodium hydride to give salts. These salts are readily alkylated or acetylated to give stable N-acyl or N-alkyl derivatives which are readily hydrolyzed to the corresponding ureas.

The monomeric compounds of this invention may be dissolved or dispersed in water or organic solvents such as acetone, benzene, methyl ethyl ketone or alcohols, to form stable solutions or dispersions. These solutions or dispersions may be applied to fibers or fabrics such as cotton broadcloth, "Orlon," "Dacron," or nylon and the fabric heated at 50–150° C. to give materials which tend to retain the preformed shape. These compounds are thus useful for forming shaped articles of fibers or fabrics as demonstrated in the following example:

Example A

Cotton broadcloth, "Orlon," "Dacron," and nylon fabrics were immersed in a solution of 1-ethoxyethylcyanamide (1 g.) dissolved in water (4 g.). The fabrics were air-dried and then heated at 60° C. for 1 hour. Additional samples of these fabrics were treated in the same way with the neat compound, and other samples with a solution of 1-ethoxyethylcyanamide (1 g.), in methyl ethyl ketone (2 g.). Fabrics treated with the neat compound or the methyl ethyl ketone solution were stiff and tended to retain a preformed shape. Those treated with the water solution were not appreciably stiffened but tended to retain a shape when formed, for example, by pressing with a hot iron.

In addition, the novel compounds of the invention can be converted to corresponding substituted ureas for use in usual urea applications. This conversion process is illustrated in the following examples:

Example B 1-(1-ETHOXYETHYL)-1-METHYLUREA

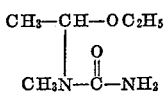

A solution of methyl-(1-ethoxyethyl)cyanamide (6.0 g., 0.047 mole) in acetone (54 ml.) was cooled in ice and 30% hydrogen peroxide (30 cc.) added at a rate to keep the temperature at 0–8° C. Aqueous 10% sodium carbonate (30 ml.) was added slowly to maintain the same temperature. When addition was complete, the mixture was warmed slowly to room temperature and stirred for 24 hours. Volatiles were removed at 1 mm./30° C. and the product slurried with absolute ethanol (50 ml.) and again evaporated to dryness under reduced pressure to give a white solid (12.4 g.). This solid was extracted with hot acetone (200 ml.) and the extract evaporated to dryness and then sublimed at 100–105° C. and $0.1\mu$ pressure to give a white, crystalline solid (6.40 g., 93.5%, M.P. 76–82°). A sample was recrystallized from carbon tetrachloride and petroleum ether (M.P. 87.8–88.8°) and identified as 1-(1-ethoxyethyl-1-methylurea).

*Analysis.*—Calcd. for $C_6H_{14}N_2O$: C, 49.30; H, 9.65; N, 19.16; M.W., 146. Found: C, 49.30; H, 9.55; N, 19.22; M.W., 141 (cryoscopic in dimethylsulfoxide).

The H n.m.r. spectrum determined in deuterochloroform with tetramethylsilane as internal standard gave a quadruplet at $\tau 4.61$ distorted by an underlined singlet centered at $\tau 4.48$ (combined weight, 3H). When deuterium oxide was added, the peak at $\tau 4.48$ shifted leaving a clean quadruplet ($J = 6.0$ c.p.s.) assigned to the single proton on carbon adjacent to oxygen. The exchangeable peak was assigned to the amide protons. A multiplet (8 lines) centered at $\tau 6.59$ (2H) was assigned to the methylene protons adjacent to oxygen. A single sharp absorption at $\tau 7.76$ (3H) was assigned to the protons of the methyl group attached to nitrogen. A doublet at $\tau 8.72$ ($J = 6.0$ c.p.s.) and an overlying triplet at $\tau 8.82$ ($J = 7.0$ c.p.s.) having a combined weight equivalent to six protons were assigned to the methyl groups attached to the carbon bearing both nitrogen and oxygen and the OCH$_2$— groups, respectively. The infrared spectrum showed absorption at 3.0, $3.14\mu$ (NH$_2$), 3.36, 3.41 and $3.47\mu$ (saturated C—H). 6.04 and $6.26\mu$ (>C=O), $7.23\mu$ (C—CH$_3$) and multiple bands at 9–9.5$\mu$ region for ether-oxygen absorption.

Example C

1-TETRAHYDROFURYL-1-METHYLUREA

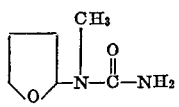

To a solution of N-methyltetrahydrofuran-2-carbamonitrile (5.0 g., 0.04 mole) in acetone (50 ml.) was added hydrogen peroxide (30% aqueous solution, 27 ml.) at 0–8° C. with stirring. A 10% sodium carbonate solution (27 ml.) was then added at 0–10° C., and when the exothermic reaction subsided the mixture was warmed to room temperature and stirred for 17 hours. Volatiles were removed in a rotary evaporator at 0.5 mm./25° C. to give a white solid (9.75 g.). The dry solid was extracted with hot acetone (200 ml.) and the solvent removed from the extract to give a white, crystalline solid (5.65 g., 99%). An analytical sample was recrystallized from carbon tetrachloride, dissolved in methylene chloride and decolorized with carbon black and then recrystallized twice from ethyl acetate to give white needles (M.P. 92.4–93.4° C.).

*Analysis.*—Calcd. for $C_5H_{12}N_2O$: C, 49.98; H, 8.39; N, 19.43; M.W., 144. Found: C, 40.09; H, 8.23; N, 19.70, 19.20; M.W., 141 (cryoscopic in dimethylsulfoxide).

The H n.m.r. spectrum determined in deuterochloroform with tetramethylsilane as internal standard gave a distorted triplet centered at $\tau 4.5$ (1H assigned to the single proton on carbon adjacent to oxygen and nitrogen, a broad absorption at $\tau 4.54$ (2H) for protons on nitrogen, a weak, strong, strong, weak absorption (further split) at $\tau 6.15$ (2H) assigned to the methylene protons adjacent to oxygen, a single peak at $\tau 7.22$ (3H) for the protons of the methyl group on nitrogen, and a complex absorption at $\tau 7.83$–$8.32$ (4H) for the two methylene groups most remote from oxygen.

The infrared spectrum showed absorption at 2.96, 3.02, 3.13 and $6.22\mu$ (NH$_2$), 3.39, $3.51\mu$ (saturated C—H), $6.06\mu$ (>C=O), and $9.60\mu$ (C—O—C).

The cyanamido-substituted polymeric alkyl ethers retain the normal usefulness of such polymeric ethers and are enhanced in versatility of use by reactivity at the cyanamido sites. For example, the cyanamido groups can be hydrolyzed in hot water to corresponding urea groups, thus providing sites for anchoring dyes or for curing by crosslinking.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows.

I claim:

1. A compound having the structural formula

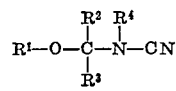

wherein:

$R^2$, $R^3$ and $R^4$, separately, are each hydrogen or lower alkyl, not more than one of $R^2$ and $R^3$ being hydrogen;

$R^1$, separately, is alkyl of up to 12 carbon atoms or substituted alkyl of up to 12 carbon atoms in which the substituent is lower alkoxy, halogen (fluorine, chlorine, bromine or iodine), cyano, lower alkoxycarbonyl, lower alkylcarbonyloxy, or nitro;

$R^2$ and $R^3$, taken together, are a divalent alkylene or an oxaalkylene group of 3–5 carbon atoms; or $R^1$ and $R^3$, taken together, are a divalent alkylene group of 1–4 carbon atoms which is (1) unsubstituted or (2) substituted with lower alkoxy.

2. The compound of claim 1 wherein $R^1$ is ethyl, $R^2$ is methyl, and $R^3$ and $R^4$ are hydrogen, 1-ethoxyethylcyanamide.

3. The compound of claim 1 wherein $R^1$ is ethyl, $R^2$ and $R^4$ are methyl, and $R^3$ is hydrogen, methyl-1-ethoxyethylcyanamide.

4. The compound of claim 1 wherein $R^1$ and $R^3$ joined together are alkylene of 3 carbon atoms, and $R^2$ and $R^4$ are hydrogen, tetrahydrofuran-2-carbamonitrile.

5. The compound of claim 1 wherein $R^1$ and $R^3$ joined together are alkylene of 3 carbon atoms, $R^2$ is hydrogen, and $R^4$ is methyl, N-methyltetrahydrofuran-2-carbamonitrile.

6. The compound of claim 1 wherein $R^1$ and $R^3$ joined together are —$CH_2$—$CH_2$—O—$CH_2$—, and $R^2$ and $R^4$ are hydrogen, 1,4-dioxane-2-carbamonitrile.

7. The compound of claim 1 wherein $R^1$ and $R^3$ joined together are —$CH_2$—$CH_2$—O—$CH_2$—, $R^2$ is hydrogen, and $R^4$ is methyl.

References Cited

UNITED STATES PATENTS 2,331,670    10/1943    Ericks et al. _____ 260—551
3,108,097    10/1963    Ugi.

FOREIGN PATENTS 1,028,967    7/1960    Germany.

OTHER REFERENCES

Chemical Abstracts, vol. 21, pp. 898–99 (1927), abstract of Traube et al. article.

HENRY R. JILES, *Primary Examiner.*

H. I. MOATZ, *Assistant Examiner.*

U.S. Cl. X.R.

260—333, 345.1, 345.7, 345.8, 347.3, 347.7, 348, 465.5, 482, 490, 551, 553, 67; 8—115.5, 116.2; 260—345.1, 490, 345.9